Feb. 12, 1924.
A. N. BLAZER
PRESSURE GENERATOR
Filed June 19, 1919
1,483,409
5 Sheets-Sheet 1
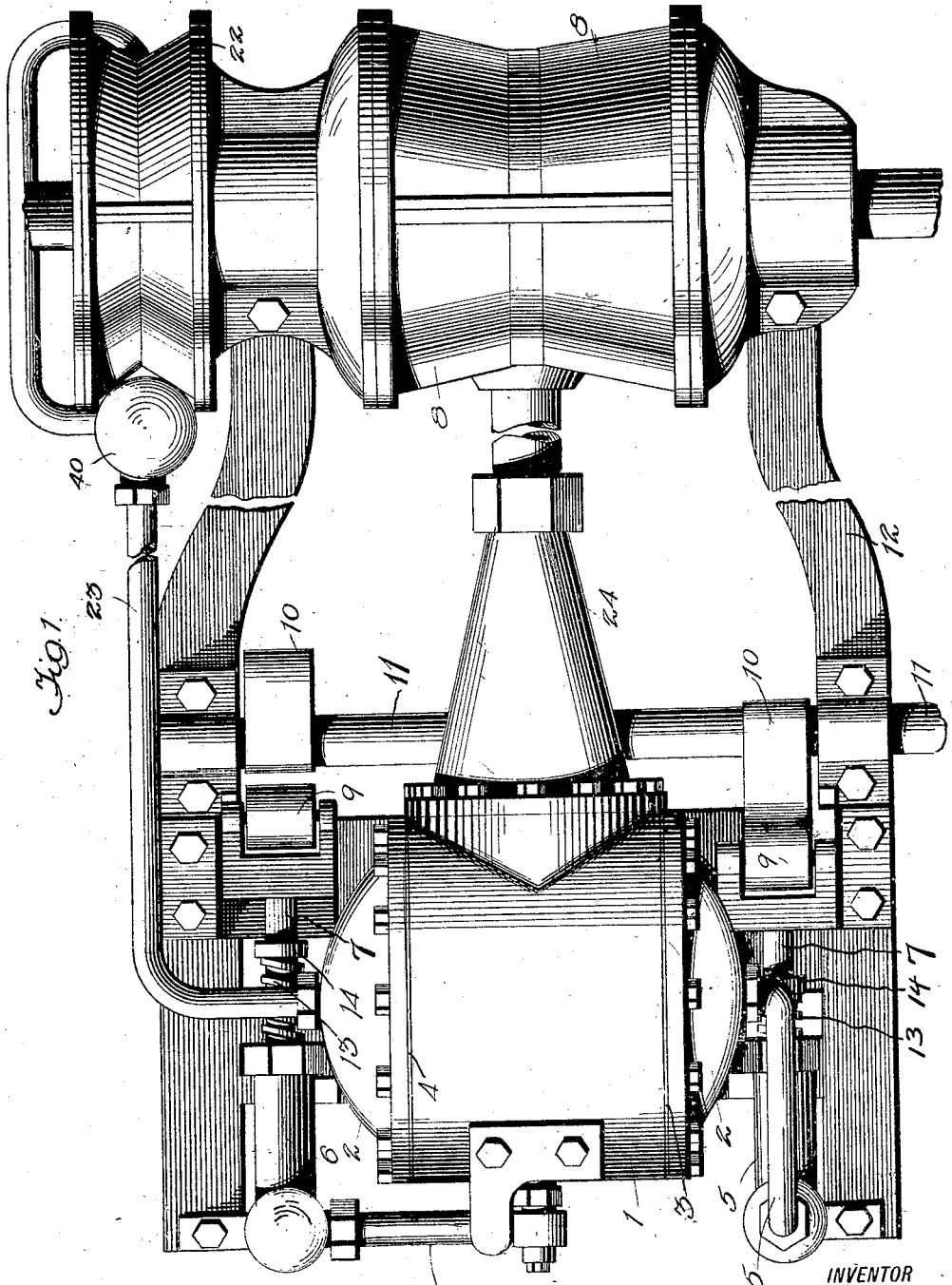
WITNESSES
INVENTOR
A. N. BLAZER,
BY
ATTORNEYS Feb. 12, 1924.
A. N. BLAZER
1,483,409
PRESSURE GENERATOR
Filed June 19, 1919    5 Sheets-Sheet 2
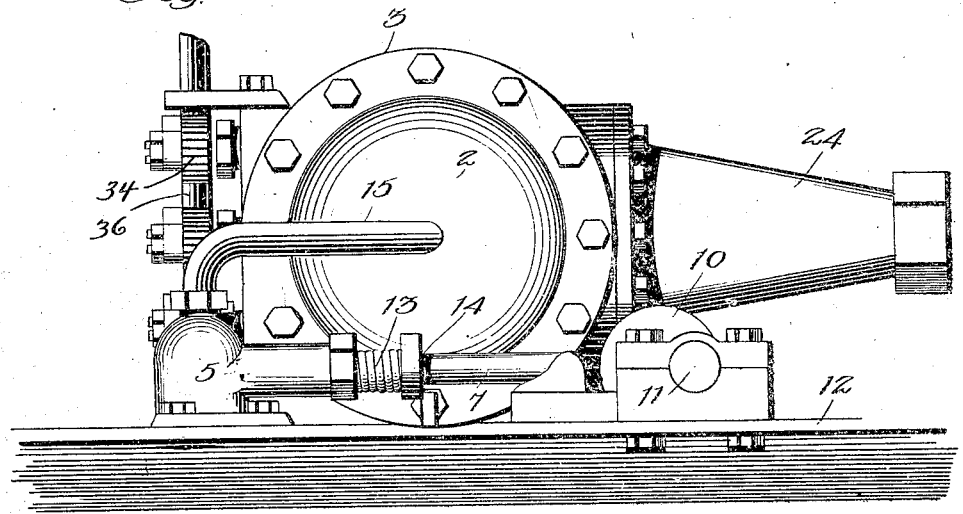
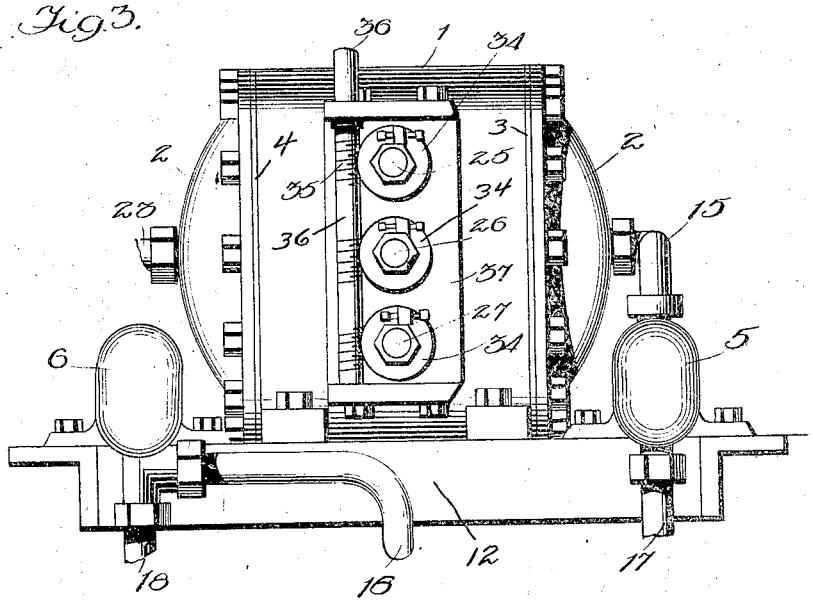
WITNESSES
George C. Myers
C. E. Trainor
INVENTOR
A. N. BLAZER,
BY Munn & Co.
ATTORNEYS Feb. 12, 1924.

A. N. BLAZER 1,483,409

PRESSURE GENERATOR

Filed June 19, 1919

WITNESSES

INVENTOR
A. N. BLAZER,

BY

ATTORNEYS

Feb. 12, 1924.

A. N. BLAZER 1,483,409

PRESSURE GENERATOR

Filed June 19, 1919      5 Sheets-Sheet 4

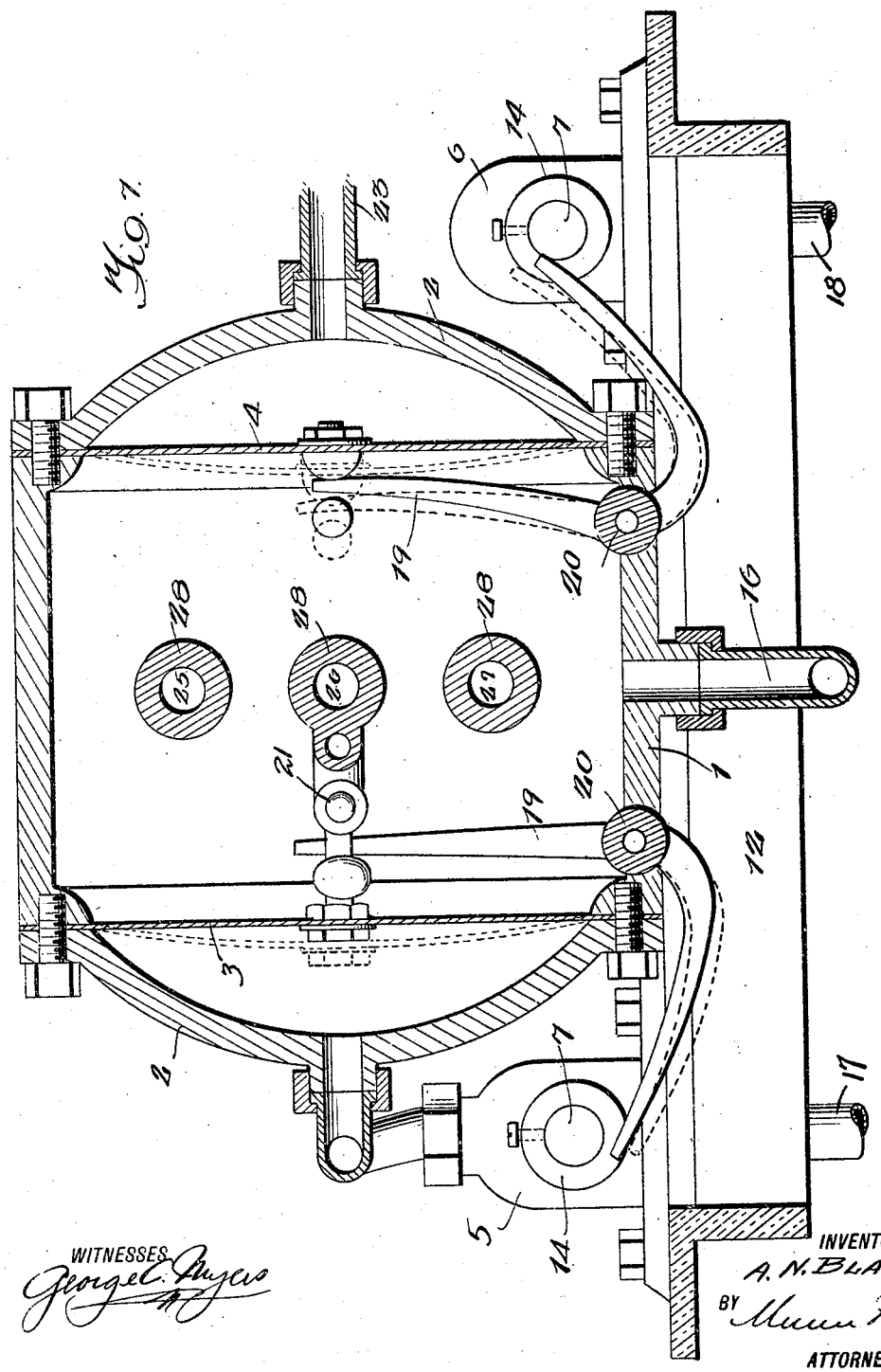

Patented Feb. 12, 1924.

1,483,409

UNITED STATES PATENT OFFICE.

ALMER NEWTON BLAZER, OF MESCALERO, NEW MEXICO.

PRESSURE GENERATOR.

Application filed June 19, 1919. Serial No. 305,251.

*To all whom it may concern:*

Be it known that I, ALMER NEWTON BLAZER, a citizen of the United States, and a resident of Mescalero, in the county of Otero and State of New Mexico, have invented certain new and useful Improvements in Pressure Generators, of which the following is a specification.

My invention is an improvement in pressure generators, wherein the original elements as, for instance, air, fuel and water are brought to the generator under a surplus pressure, and has for its object to provide a generator of the character specified for developing a continuous pressure of fluid, as, for instance, gas, steam, combined gas and steam, gases of combustion and water, or other combinations, for any purpose, as, for instance, operating an engine, with provisions for maintaining the initial pressure of the several expansive elements in separate chambers for each element.

A further object of the invention is to bring the air and fuel separately from their respective chambers to a combustion chamber and mixing them in combustible proportions and igniting the mixture.

A further object of the invention is to introduce the water in such amount that the heat of combustion will evaporate the same under required pressure and in uniting the gases of combustion with the steam produced, delivering the combined volume under pressure to the engine.

In the drawings:

Figure 1 is a top plan view of the improvement in connection with the engine;

Figure 2 is a side view;

Figure 3 is a rear view;

Fig. 7 is a vertical transverse sectional view taken on line 7—7 of Fig. 5.

Figure 4:
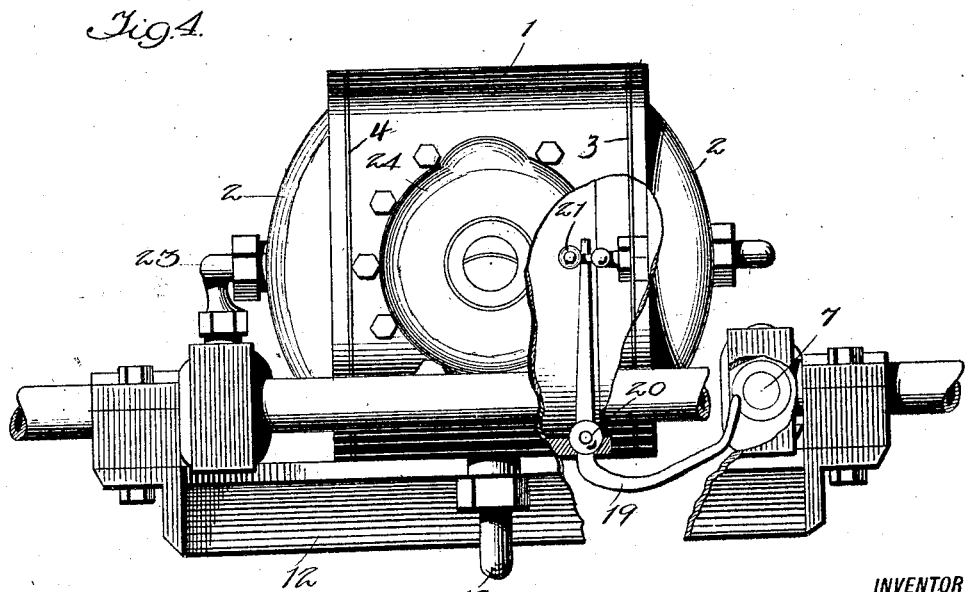
Figure 4 is a front view.

In the present embodiment of the invention a suitable casing is provided, consisting of a cylindrical body 1 and heads 2 and, referring to Figures 1 and 4, it will be seen that the heads are convex. Flexible diaphragms 3 and 4 are arranged between the heads and the body, thus constituting three chambers in the casing, namely, a central water chamber and lateral fuel and air chambers.

The water and fuel are supplied to their respective chambers by reciprocating pumps 5 and 6 of usual construction, each pump having a piston rod 7 which extends toward the engine 8, and is provided with a roller 9 at the end remote from the pump for engagement by a cam 10 on a cam shaft 11 which is journaled transversely of the bed plate 12 between the engine and the casing.

This bed plate 12 supports the generator and is rigidly connected with the engine. The plungers of the pumps are moved in one direction by the cam and in the other direction by coil springs 13 which encircle the rods between stops 14 on the rods and the barrels of the pumps. The fuel flows from the pump 5 through a pipe 15 to the chamber adjacent to the diaphragm 3 and thence through a port, to be later described, to a valve 26 to be also described, and the water passes from the pump 6 by way of a pipe 16 to the central chamber, from which it has access directly to the valve 25, to be described, through openings in a tubular casing 28.

This pipe 16, as shown, opens at the bottom of the chamber, and the pumps 5 and 6 have supply pipes 17 and 18, respectively. The operation of each pump 5 and 6 is controlled by a bell crank 19 which is pivoted at 20 in the wall of the central chamber, and one of the arms of each bell crank is connected to the adjacent diaphragm, as shown at 21. The other arm of the bell crank engages the adjacent plunger rod, in front of the stop 14 on the rod, to restrain the rod from movement under certain conditions to be later set forth.

It will be evident that when the diaphragm moves inwardly, that is, when the volume in the water chamber is reduced by discharge to the combustion chamber, the pressure in the adjacent lateral air chamber will move the diaphragm inwardly toward the central chamber and will draw the bell crank away from the plunger rod of the water pump, to permit the spring to operate the same. The fuel pump is controlled in a similar manner by the diaphragm adjacent to the fuel chamber; when the volume of fuel is reduced, the fuel or water will thus be driven into their respective chambers until the diaphragms return to normal position. Air is supplied under pressure to the air chamber, through a pipe 23, whence a port leads to a valve 27.

The original elements under equal pressure of the air are those brought under control of the valves and discharged into the funnel-shaped combustion chamber in defined proportions. Here combustion occurs and the combined products of combustion and evaporation are delivered to the engine through the small end of the element 24, as shown in Figure 1.

The flow of the water, fuel and air from the respective chambers to the combustion chamber is controlled by three needle valves 25, 26 and 27, respectively, which are arranged in tubular casings 28 extending through the central chamber 1 at the center thereof. Each of these tubular casings has a nozzle 29, 30 and 31, respectively, which delivers to the combustion chamber 24.

Figure 5:
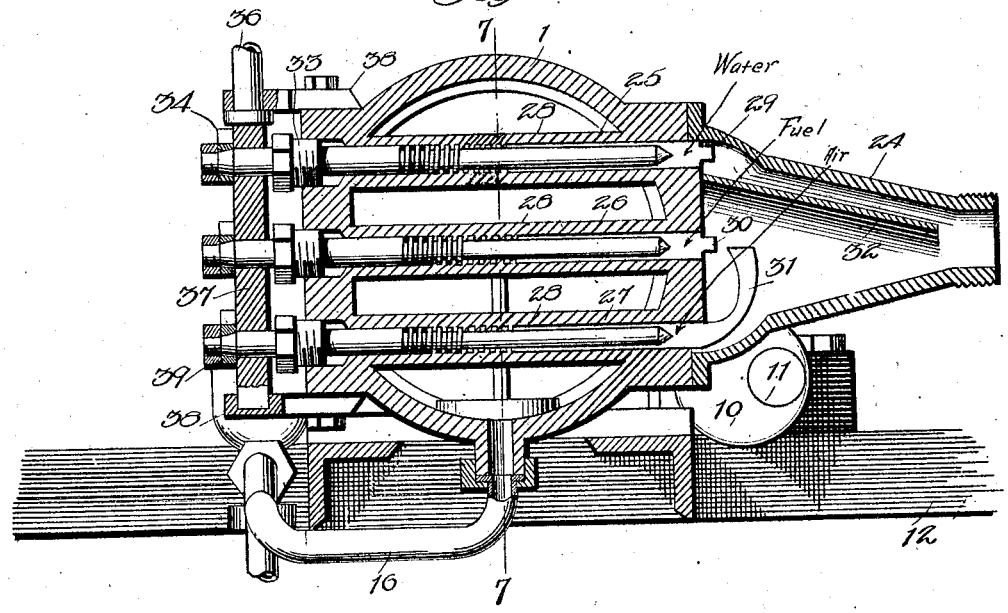
Figure 5 is a vertical section on the central line.

Referring to Figure 5, it will be seen that the nozzle 31 curves upward toward its free end, delivering at the outlet of the nozzle 30 and that the nozzle 29 delivers behind a baffle plate or jacket 32 which separates the water from the fuel and air mixture during combustion of the fuel.

Figure 6:
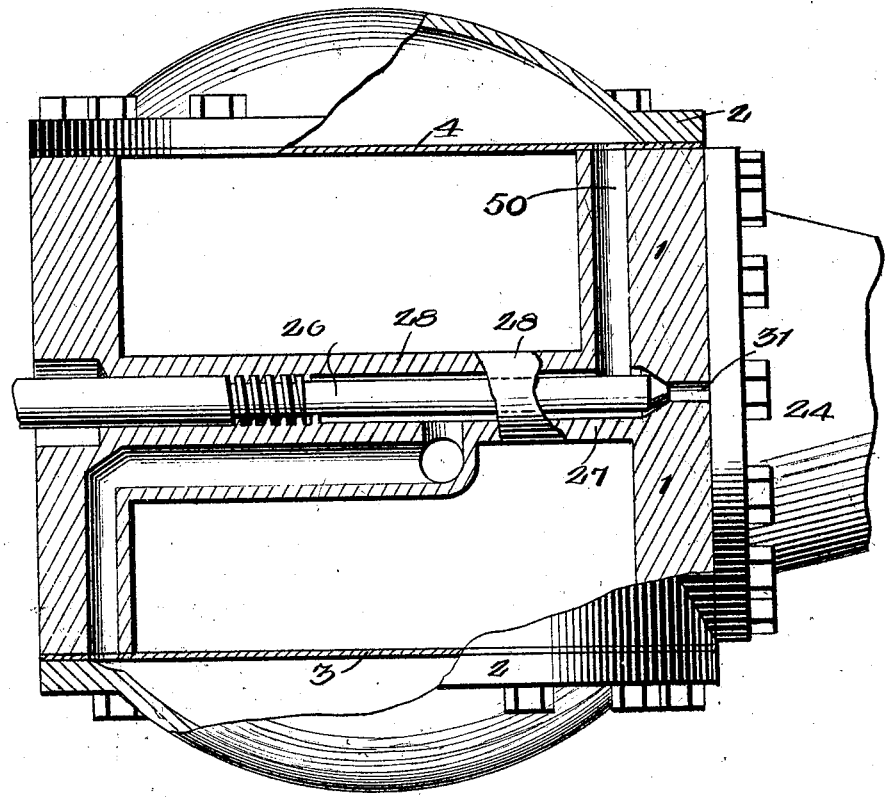
Fig. 6 is a fragmentary horizontal sectional view through the generator.

It will be noted, referring to Figure 6, that the port or passage 50 leads laterally inward from the chamber at the diaphragm 4, and this port or passage 50 opens into the casing 28 which contains valve 27, the said valve controlling the flow of air. A port or passage 52 leads inwardly from the chamber adjacent to the diaphragm 3 at that end of the casing remote from the air chamber, the passage 50 being at the end adjacent to the air chamber, and thence forwardly to deliver to the passage 28 containing the valve 27. These ports 50 and 52 are placed at the ends of the housing 1, in order that they may not interfere with the flexibility of the diaphragm.

Any suitable igniting device may be arranged to ignite the mixture of fuel and air. Each of the needle valves passes through a stuffing box 33 at the outer end of the tubular casing 28 in which it is arranged, and a worm wheel 34 is secured to each valve outside of the casing. These worm wheels are engaged by worms 35 on a common shaft 36 which is journaled in a bracket 37 held at the rear of the casing by plates 38 secured to the casing and engaging the top and bottom of the bracket.

The worm wheels are held on tapering portions of the valves by lock nuts 39, and it will be obvious that by means of the shaft the valves may be simultaneously adjusted. It will be seen that the adjustment of the shaft 36 will result in the simultaneous rotation of the members 25, 26 and 27 so that the supply of water, fuel and air is simultaneously regulated. Of course, any suitable means may be employed for turning the shaft 36.

Attention is directed to Figure 5 wherein it is illustrated that the members 25, 26 and 27 have threaded engagement with the intermediate portions of the tubular casings 28 as indicated at 189 so that when the valves 25, 26 and 27 are rotated they will be moved longitudinally. Of course, a very slight longitudinal movement of the valves 25, 26 and 27 is sufficient to seat or unseat the same and consequently the worm wheels 34 will at all times be in engagement with the operating shaft.

In operation, the initial pressure is determined by the pressure of the air in the chamber adjacent to the diaphragm 4 and controlled in any suitable manner. The central and the other lateral chamber are filled to capacity with water and fuel, and the three elements, through the flexing of the diaphragm, are brought under equal pressure and so maintained to the extent limited by the flexibility of the diaphragm.

Air flows through the nozzle 31, and is mixed with the fuel flowing through the nozzle 30. This combustible gas is fired by any suitable firing means, and continues to burn as the air and fuel flow. The baffle plate 32 and the tube 24 are heated and the water flowing in over the baffle plate is vaporized, forming steam which is united with the burning gases and is delivered to the engine.

I claim:

1. The combination with a casing having end walls, of diaphragms confined between said end walls and the casing thereby forming fuel, water and air chambers, means supplying water and fuel to their respective chambers, and regulating devices operated by said diaphragms for controlling said supply means.

2. The combination with a casing, of diaphragms arranged within the casing and defining fuel, water and air chambers, means supplying water and fuel to their respective chambers, and regulating devices operated by said diaphragms for controlling said supply means whereby the pressure in one of said chambers regulates the pressure of the other chambers.

3. The combination with a casing, of diaphragms arranged within the casing and defining fuel, water and air chambers, means supplying water and fuel to their respective chambers, regulating devices operated by said diaphragms for controlling said supply means whereby the pressure in one of said chambers regulates the pressure of the other chambers, and a combustion chamber having communication with said chambers.

4. The combination with a casing, of diaphragms arranged within the casing and defining fuel, water and air chambers, means supplying water and fuel to their respective chambers, regulating devices operated by said diaphragms for controlling said supply means, whereby the pressure in one of said chambers regulates the pressure of the other chambers, a combustion chamber having communication with said chambers, and valves controlling communication between said first named chambers and said combustion chamber.

5. The combination with a casing having end walls, of diaphragms defined between said end walls and the casing thereby forming a plurality of chambers, pumps supplying fluid to certain of said chambers, and bell cranks having connection with said diaphragms and said pumps whereby the pressure in one of said chambers regulates the operation of said pumps for controlling the supply of fluid to the other chambers.

6. The combination with a casing having end walls, of diaphragms confined between said end walls, and the casing thereby forming a plurality of chambers, pumps supplying fluid to certain of said chambers, bell cranks having connection with said diaphragms and said pumps whereby the pressure in one of said chambers regulates the operation of said pumps for controlling the supply of fluid to the other chambers, and a combustion chamber associated with said first-named chambers.

7. The combination with a casing having diaphragms defining a plurality of chambers, bell cranks having connection with said diaphragms, and pumps for supplying certain of said chambers with fluid, said pumps being provided with stop elements adapted to be engaged by said bell cranks when the pressure in one of the chambers exceeds a predetermined point, whereby to shut off said pumps.

ALMER NEWTON BLAZER.